Sept. 26, 1933.                J. PELOUCH                  1,928,461
                                  VALVE
                           Filed Sept. 16, 1930
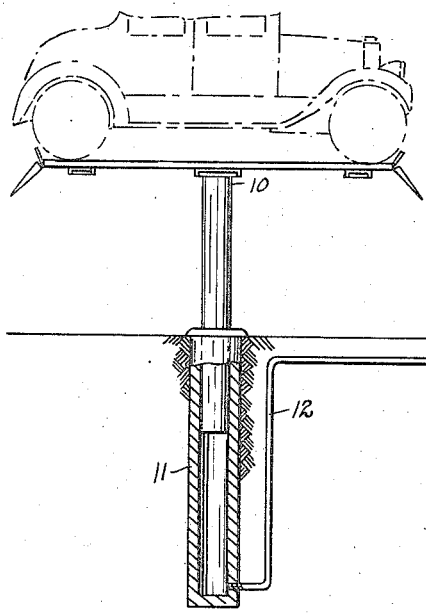
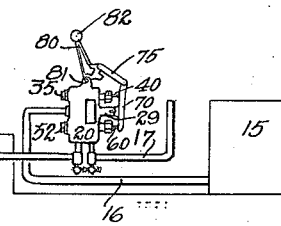
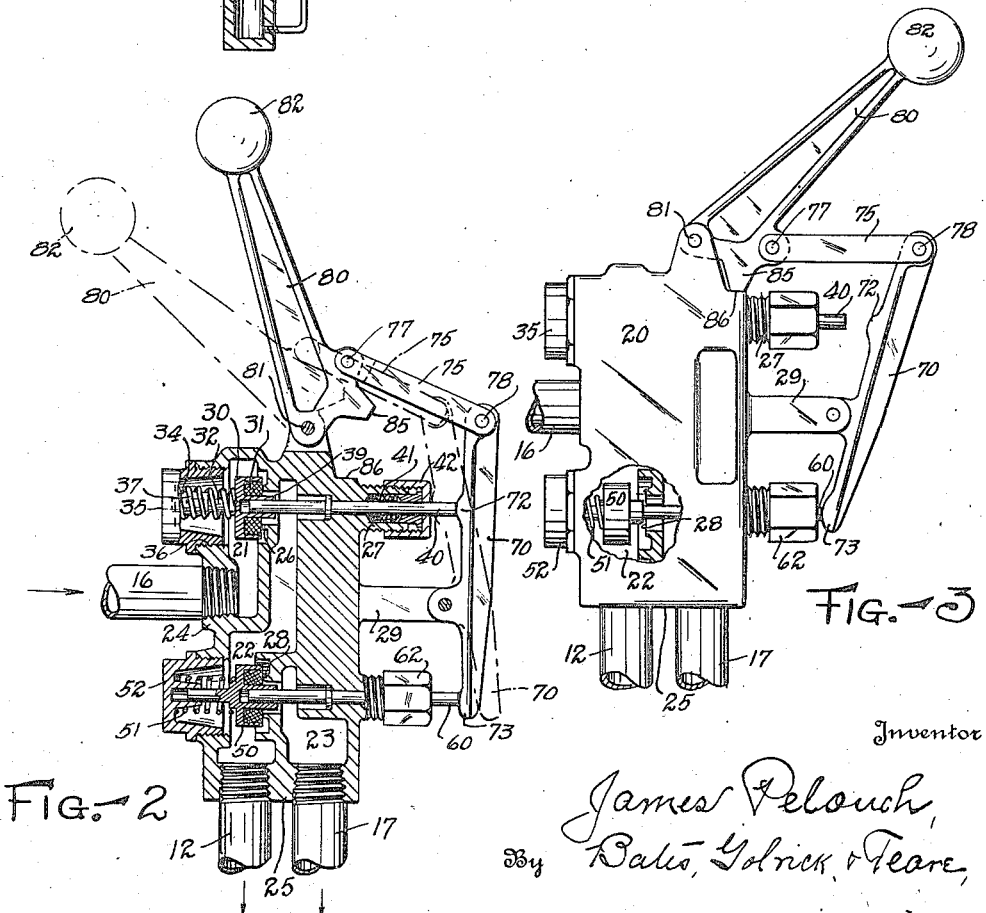
FIG.-1
FIG.-2
FIG.-3
Inventor
James Pelouch,
By Bates, Goldrick & Teare,
Attorneys Patented Sept. 26, 1933

1,928,461

UNITED STATES PATENT OFFICE 1,928,461

VALVE

James Pelouch, Cleveland, Ohio, assignor to The United States Air Compressor Company, Cleveland, Ohio, a corporation of Ohio Application September 16, 1930
Serial No. 482,266

2 Claims. (Cl. 137—144)

This invention relates to a manually operable valve for controlling fluid admission to a conduit and exhaust therefrom, according to the direction of operation of the valve. My valve is especially well adapted for controlling pneumatically operated devices, as for instance a plunger lift for raising automobiles. With such an operation, it is desirable that the raising action of the lift be dependent on the operator maintaining manual pressure on the valve handle, so that the lift will rise to just the height desired. On the other hand, in lowering the elevator it is entirely practicable to set the valve at exhaust position and allow the elevator to come down to the limit.

My valve is designed for carrying out the desirable operation just mentioned and accordingly is provided with a single manual control lever which by movement in one direction may open the inlet valve, but can hold it open only so long as the operator maintains pressure on the lever; by movement in the other direction the lever not only opens the exhaust valve, after the closing of the inlet, but may be swung to a position where it will automatically hold itself with the exhaust continuously open and without attention by the operator. These characteristics comprise one feature of this invention.

Valves of this character are frequently used out of doors where any condensed moisture in the compressed air trapped in the valve might freeze and interfere with satisfactory operation. My valve has been especially designed to prevent the trapping of such condensed moisture at any place in the valve. The arrangement of the passageways and other parts to accomplish this is also a feature of my invention.

In the drawing, which illustrates one embodiment of my invention; Fig. 1 is a side elevation of the valve connected with a plunger automobile-lift, which is shown in a simplified diagrammatic manner; Fig. 2 is a vertical section on an enlarged scale of my valve in its normal or idle position with both the inlet and exhaust closed, this view showing, in dotted lines, the position of the control mechanism when the inlet is open; Fig. 3 is a side elevation of my valve partly broken away, showing the controlling mechanism in the position it occupies while the fluid is exhausting; that is to say, during the lowering of the elevator.

As illustrated in Fig. 1, 10 indicates a suitable automobile lift having a plunger. This plunger is shown as mounted directly in a vertical cylinder 11 in the ground. 12 indicates an air conduit leading from the bottom of the cylinder to the valve. 15 designates a compressed air tank; 16 is a conduit therefrom to the valve; 17 an exhaust pipe from the valve. It is to be understood that in practice the compressed air usually acts on a body of oil which forms the immediate conduit with the plunger, but the simpler form shown in Fig. 1 is believed to illustrate the essential function of the pipe 12, which is to convey compressed air to the cylinder when it is desired to raise the platform and allow it to exhaust from the cylinder when the platform is to be lowered.

The valve proper comprises a casing 20 having an internal passageway 21 with which the compressed air supply pipe connects; an internal passageway 22 connecting with the pipe 12 to and from the elevator, and an internal passageway 23 connected with the exhaust pipe 17. The passageway 22, which I may call the working passageway, is preferably located intermediately in the block constituting the valve casing, while the inlet passageway 21 is on one side of this working passageway adjacent the upper portion of the casing and the exhaust passageway 23 is on the opposite side of the working passageway in the lower portion of the valve casing. Suitable valve plugs hereinafter described control admission from the inlet passageway 21 to the working passageway 22, and from the passageway 22 to the exhaust passageway 23.

It will be noticed that the casing 20 stands in a vertical position and that all three internal passageways 21, 22 and 23 are substantially vertical throughout, there being no pockets therein in which condensed moisture may accumulate. Any moisture in any of the passageways will simply run into the pipe connected therewith. The admission pipe 16 enters the casing horizontally, being shown as threaded into a boss 24 at the side of the casing, while the pipes 12 and 17 enter the bottom of the casing, being shown as threaded into the thickened bottom 25, and in each instance the pipe will drain the passageway.

30 designates the valve plug controlling the admission from passageway 21 to passageway 22. This plug, as shown, is a disk-like member having a recess in which seats suitable washer 31 of proper material to coact with the valve seat. This plug has on one side a stem 32 which slidably enters a cylindrical recess in a boss 34 carried by a suitable bonnet 35 connected with the casing by an externally threaded sleeve portion 36 screwing into the casing. A helical compression spring 37 surrounding the tubular boss 34 maintains the valve 30 normally against its seat 26.

The valve 30 is provided on its active side with a tubular extension 39 which is freely occupied by the inner end of a slidable operating rod 40. This rod passes out through a stuffing box carried by the casing. The drawing shows a tubular extension 27 of the casing which carries the usual annular packing 41 and a suitable packing nut 42. It will be seen that the spring normally maintains the valve closed but an inward pressure on the rod 40 will unseat the valve and allow access from the passageway 21 to the passageway 22 leading to the elevator.

The exhaust valve 50 is formed similarly to the intake valve 30 already described. It is pressed toward its seat 28 by a spring 51 carried by the bonnet 52 and is adapted to be unseated by a push rod 60 mounted in the stuffing box within the packing nut 62.

In my valve, the two valve plugs 30 and 50 are adapted to be operated alternately. To this end, I provide a lever 70 pivoted intermediately on a bracket 29 extending from the valve casing. A suitable protuberance 72 on the lever is adapted to abut the valve rod 40 and unseat the inlet valve when the upper end of the lever is pulled toward the casing. Similarly, a protuberance 73 on the lower end of the lever abuts the valve rod 60 and unseats the exhaust valve when the lower end is pushed toward the casing.

The lever 70 extends above the protuberance 72 and at its upper end is connected by a link 75 with an operating lever 80. This lever 80 is shown as pivoted at 81 to the valve casing and extending in a generally upward direction therefrom and carrying at its extreme end a suitable hand knob 82. It is convenient to mount the lever 80 between a pair of ears on the casing and to bifurcate the link 75 at its opposite ends, so that it may be effectively pivoted to the levers 80 and 70, as shown in the drawing.

The normal position of the hand lever 80, the link 75, and the stem-engaging lever 70 is that shown in full lines in Fig. 2. The two valve springs 37 and 51 normally maintain the valve stems 40 and 60 in their outermost position, and these stems hold the lever 70 practically vertically, as shown. Now to open the admission valve, which admits compressed air from the pipe 16 to the elevator pipe 12, the operator simply presses manually on the knob 82 carrying it toward the left in Fig. 2; that is into the position shown in broken lines in that figure, and holds it there with the pressure of his hand. This movement swings the upper end of the lever 70 toward the valve casing and pushes the valve plug 30 away from its seat, allowing compressed air to pass from the inlet pipe 16 and passageway 21 to the passageway 22 and the elevator pipe 12, thus serving to raise the elevator as long as the operator continues his pressure on the knob 82.

Whenever the manual pressure is relieved, the compression spring 37, reacting, forces out the stem 40, and closes the admission valve, returning the parts to the position shown in full lines in Fig. 2, and thereupon the raising of the elevator stops, and the elevator remains in the position thus given it.

To lower the elevator, the operator swings the lever 80 in the opposite direction, thus causing the lower end of the lever 70 to push the stem 60 inward, unseating the valve 50. The operator may manually hold the valve in this position, lowering the elevator any desired amount. If, however, he desires to lower it to the ground he may simply throw the lever 80 to its limit, carrying it into the position shown in Fig. 3.

In this movement, the pivotal point 77 joining the link 75 to the lever 80 is carried below the line connecting the pivot 81 of the lever with the pivotal point 78 joining the link to the lever 70. In other words, the toggle joint has passed beyond the dead center. It is stopped in this position by reason of a lug 85 on the lever abutting against a flattened shoulder 86 on the casing.

By reason of the effective toggle passing beyond the dead center, the parts tend to remain in this position as shown in Fig. 3. This leaves the valve plug 50 forced away from its seat by the inward position of the stem 60, and accordingly connects the elevator pipe 12 with the exhaust pipe 17 and leaves it standing in that position. Thus, the elevator descends to the limit; that is until it comes to the ground.

It will be seen that my valve accomplishes the very desirable result of making the lifting of the elevator dependent upon the continued attention of the operator, who must maintain his hand on the valve. He thus can raise the elevator to any desired point, but cannot leave it running upward unattended, since as soon as he relieves his manual pressure it automatically swings to idle position. In lowering however, the attendant may maintain manual control or he can simply swing the lever to the extreme position, as shown in Fig. 3, where the toggle will hold it indefinitely.

I claim:—

1. In a valve, the combination of a casing having a working passageway, an inlet passageway and an exhaust passageway, a pair of valves respectively connecting the working passageway with the inlet passageway and the exhaust passageway, an intermediately pivoted rocking lever adapted to act alternately on the two valves to unseat them against spring pressure, a manually operable actuating lever, and a link connecting the latter lever with the valve lever and so arranged that it may be swung past the dead center when the valve connecting the working passageway with the exhaust is operated but not when the other valve is operated.

2. In a valve, the combination of a casing having a working passageway, an inlet pasageway and an exhaust passageway, a pair of valves controlling said passageways respectively, a pair of slidable stems for operating the respective valves against the force of springs tending to seat them, an intermediately pivoted rocking lever adapted to bear against one stem or the other, a manual lever pivoted to the casing, a link pivotally connected with the manual lever and the rocking lever, and a stop adapted to hold the manual lever in position with the toggle joint, provided by it and the link, past the dead center to maintain open the valve connecting the working passageway with the exhaust passageway.

JAMES PELOUCH.